(12) United States Patent
Daiss et al.

(10) Patent No.: US 6,445,084 B1
(45) Date of Patent: Sep. 3, 2002

(54) IMMOBILIZING DEVICE FOR A MOTOR VEHICLE

(75) Inventors: Michael Daiss, Filderstadt; Michael Geber, Bad Urach, both of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/385,366

(22) Filed: Aug. 30, 1999

(30) Foreign Application Priority Data

Aug. 28, 1998 (DE) ......................................... 198 39 349

(51) Int. Cl.⁷ ............................................. B60R 25/00
(52) U.S. Cl. ..................................... 307/10.2; 307/10.5
(58) Field of Search ............................... 307/10.1–10.6; 180/287; 340/426; 200/5 R, 5 E, 18, 50.36

(56) References Cited

U.S. PATENT DOCUMENTS

| | | | | |
|---|---|---|---|---|
| 3,784,839 A | * | 1/1974 | Weber .................... | 307/10 AT |
| 3,834,484 A | * | 9/1974 | Sangster .................... | 180/114 |
| 5,570,756 A | * | 11/1996 | Hatcher .................... | 180/287 |
| 5,608,272 A | * | 3/1997 | Tanguay .................... | 307/10.2 |
| 5,670,831 A | * | 9/1997 | Georgiades ................ | 307/10.3 |
| 5,808,372 A | * | 9/1998 | Schwegler et al. ......... | 307/10.3 |
| 5,818,330 A | * | 10/1998 | Schweiger ................. | 340/426 |
| 5,991,159 A | * | 11/1999 | Kraiczyk .................... | 361/737 |
| 6,194,997 B1 | * | 2/2001 | Buchner et al. ............ | 340/426 |

FOREIGN PATENT DOCUMENTS

| | | | |
|---|---|---|---|
| DE | 79 27 688 | | 8/1980 |
| DE | 82 19 522.6 | | 1/1983 |
| DE | 87 08 510.0 | | 12/1987 |
| EP | 0 314 611 A1 | | 5/1989 |
| FR | 2 685 517 A1 | * | 11/1991 |
| FR | 2 667 554 A1 | * | 4/1992 |
| GB | 2 334 360 A | * | 8/1999 |
| JP | 6-21110 | | 8/1994 |
| JP | 7-165017 | | 6/1995 |

OTHER PUBLICATIONS

Derwent English Translation of Abstract of FR 2 685 517 A1, Pub date Jun. 1993.*
Derwent 1999–461073, English translation of abstract of GB–2 334 360–A, Pub. Aug. 18, 1999.*
Derwent 1992–177181, English translation of abstract of FR–2 667 554–A1, Pub. Apr. 1992.*
B. Preimer, Kleines Wunder—Vorstellung Mercedes S–Klasse [Minor miracle—Introduction to the Mercedes S–Class], Auto Motor Sport, 15/1998, p. 16.
Schneider et al., "Vehicle Security System Dispensing with Mechanical Key", Automobiltechnische Zeitschrift 96 (1994), pp. 321–323, 330.
Schrey et al., "Smart Card—Abschied vom Autoschlüssel", Siemens–Zeitschrift, Jan. 1996, pp. 32–35.

* cited by examiner

Primary Examiner—Brian Sircus
Assistant Examiner—Sharon Polk
(74) Attorney, Agent, or Firm—Crowell & Moring LLP

(57) ABSTRACT

An immobilizing device for a motor vehicle includes an immobilizer control unit on the vehicle, one or more authentication elements which can be carried by the user, and an actuation communication channel for immobilizer actuation communications which require authentication, between the authentication element and the immobilizer control unit. The immobilizer control unit allows driving operation and/or engine starting only if the driving authorization check is positive. According to the invention, an immobilizer operating element arranged on the vehicle can be operated without any manipulation of an authentication element, for user-requested initiation of the immobilizer actuation communication processes which require authentication. Alternatively or additionally, the brake pedal can be used as an operating element for activating engine starting, once it has been enabled by the immobilizer control unit.

8 Claims, 2 Drawing Sheets

IMMOBILIZING DEVICE FOR A MOTOR VEHICLE

BACKGROUND AND SUMMARY OF THE INVENTION

This application claims the priority of German patent document 198 39 349.0, filed Aug. 28, 1998, the disclosure of which is expressly incorporated by reference herein.

The invention relates to a vehicle immobilizing device having an authentication element which can be carried by an authorized vehicle operator.

Previous immobilizing devices of this type in cars have generally comprised only mechanical keys/ignition locking systems. That is, the immobilizer control unit on the vehicle was formed only by a mechanically operable ignition lock, which could be operated by mechanical keys carried by the user as authentication elements via the associated actuation communication channel. In such systems, in order to switch on the general vehicle power supply in a first stage the mechanical lock is switched to the so-called "radio position" or standardized terminal 15R; in a second stage, the ignition is switched on via standardized terminal 15 and, in a third stage the engine starting unit is activated via standardized terminal 50. Once the engine has been started, the key returns to the ignition-on position.

Such mechanical immobilizing devices are nowadays increasingly being replaced, or at least supplemented, by electronic immobilizers. These modern, electronic driving authorization systems do not require a mechanical lock, but use a wireless actuation communication channel for authentication communication. A first type of such systems uses electronic keys as authentication elements, by analogy with classical mechanical key and lock systems. Depending on the system design, control buttons are provided on the electronic keys in order to initiate an immobilizer actuation communication which requires authentication (that is, a check of the driving authorization), or such communications are carried out via a close-field communication channel. In the latter systems, the key is introduced into a key holder provided on the vehicle in the form, for example, of an electronic ignition lock.

So-called "keyless-go" systems are also known and are gaining increasing attention at present. In these systems, authentication elements, such as smart cards or transponders carried by the vehicle user, require no action by the user. Authentication communication in such systems are initiated on user request, or automatically when a valid authentication element is in the effective area of the associated actuation communication channel. The effective area is, typically, defined by the transmit/receive range of an associated antenna apparatus.

In addition to ignition key/ignition lock units which check driving authorization, systems may also be provided for switching the vehicle engine off automatically or when requested by the user, and for switching it on again when requested by the user. Such systems generally include an appropriate control element arranged on a transmission selection lever. See the German Utility Model Documents DE 79 27 688 U1, DE 82 19 522 U1 and DE 87 08 510 U1 as well as Laid-Open Specification EP 0 314 611 A1. These known devices are used to switch the engine off in order to save fuel when the vehicle is temporarily stationary, for example at junctions or in a traffic jam. In this case, the ignition remains switched on while the engine is temporarily switched off (that is, driving authorization is not inhibited). In a further development of this system type in the journal publication B. Priemer, Kleines Wunder—Vorstellung Mercedes S-Klasse [A small miracle—Introduction to the Mercedes S Class], auto motor sport, 15/1998, page 16, it is proposed that the vehicle no longer be started by means of an ignition key but by means of a small button which is located on the control gate of an automatic transmission selection lever.

One object of the invention is to provide an immobilizing device of the type mentioned above, which, if required, can be in the form of a keyless-go system, and in which immobilizer actuation communication processes which require authentication can be initiated on user request with a high level of user convenience, and/or which can be activated with a high level of convenience of use by the vehicle driver after enabling engine starting.

These and other objects and advantages are achieved by the vehicle immobilizing device according to the invention in which actuation communication processes which require authentication (those which are accompanied by a check of user authorization) are carried out on user request. For this purpose, an appropriate immobilizer operating element arranged on the vehicle can be operated without any authentication element (that is, without using the authentication element itself).

The invention is also suitable, in particular, for configuration as a keyless-go system, in which the user needs only carry his or her authentication element, for example a smart card. Actuation measures for driving authorization can be requested by operating the immobilizer operating element from the driver's seat. The authentication process initiated in this way is completed successfully, provided that the authentication element, which is carried by the driver and is located in the effective area of the actuation communication channel, is valid for the associated vehicle.

According to one embodiment of the invention, the immobilizer control part enables driving authorization and causes the engine to be started, via an appropriate authentication communication, only when the user operates the brake pedal and keeps it depressed. In this embodiment, engine starting is enabled by a successfully completed authentication process on request via an immobilizer operating element, and comprises the process of switching on the previously switched-off ignition. This device as well is highly suitable for configuration as a keyless-go system, in that engine starting is enabled automatically or on user request via the authentication element carried by the user.

According to another embodiment of the invention, the immobilizer operating element (by means of which the user can initiate immobilizer actuation communication processes which require authentication) comprises a button arranged on the transmission selection lever, thus allowing particularly convenient operation by the driver.

In still another embodiment, the immobilizer operating element is a multistage button element. A first button stage is used to initiate an ignition switching-on process, which requires authentication, while another button stage allows the ignition to be switched off.

Yet another embodiment of the invention includes a multistage button element as an immobilizer operating element. One button stage is used to switch the ignition on, which requires authentication, while another button stage is intended to initiate (activate) engine starting. In conjunction with a keyless-go system, for example, such a button system can carry out all the functions of conventional ignition-lock systems.

Other objects, advantages and novel features of the present invention will become apparent from the following detailed description of the invention when considered in conjunction with the accompanying drawings.

DETAILED DESCRIPTION OF THE DRAWINGS

Figure 1:
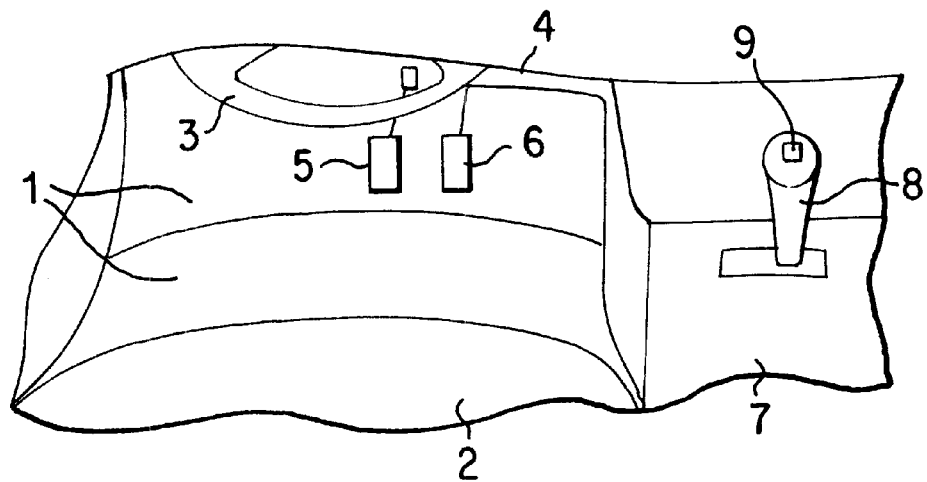
FIG. 1 is a schematic view of part of the driver's seat area of a vehicle having an immobilizing device with the ignition operated by a button and with engine starting operated by the brake pedal.

FIG. 1 shows a schematic view of the driver's seat area of a passenger vehicle. A conventional range of pedals with a brake pedal 5 and an accelerator pedal 6 is located in the footwell area 1, between a driver's seat 2, a steering wheel 3 and dashboard 4. An automatic transmission selection lever 8 is located on a centre tunnel 7 and a button 9 which acts as an immobilizer operating element is arranged on the top of this lever.

Figure 3:
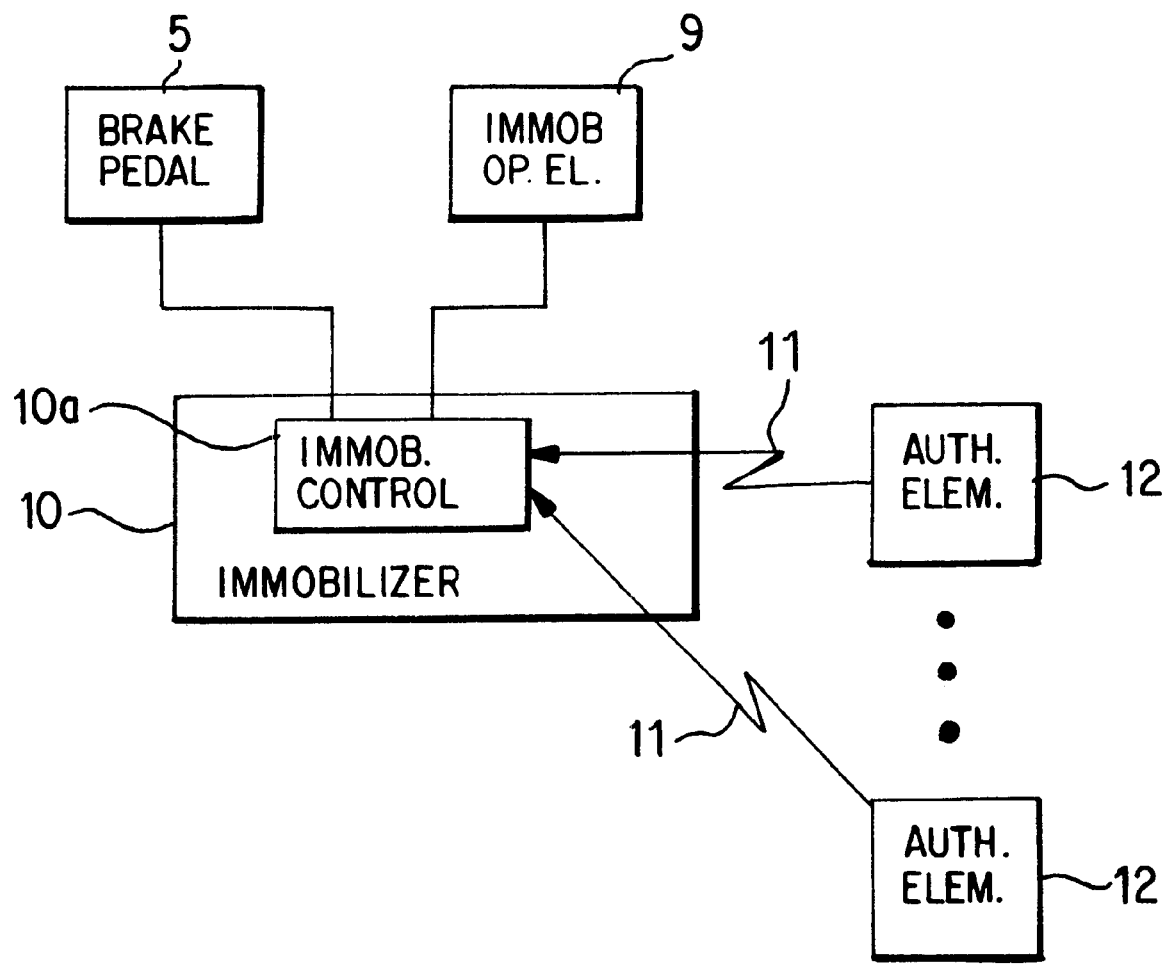
FIG. 3 is a schematic block diagram of the immobilizing device according to the invention.

As shown in FIG. 3, the immobilizer is an electronic immobilizing device 10 of the keyless-go system type. It has an appropriate, conventional immobilizer control unit 10a on the vehicle, and a wireless immobilizer actuation communication channel 11 for actuation communications which require authentication (that is, a check of driving authorization), between the immobilizer control unit 10a and authentication elements 12 which are carried by the authorized vehicle users, preferably in the form of smart cards. The brake pedal 5 and the button 9 are included in this keyless-go system as control elements which can be operated by the user and are related to immobilization.

Once an authorized vehicle user has entered the vehicle, with his or her valid authentication element, and has sat down on the driver's seat 2, the authentication element 12 carried by the driver is located in the effective area of the immobilizer actuation communication channel. The button 9, which is in the form of a rocker switch for example, is now used by the vehicle user to issue a command (which requires authentication) to switch on the ignition. That is, the operation of the button 9 first of all initiates an authentication process between the authentication element 12 and the immobilizer control unit 10a via the associated communication channel 11.

A further condition provided for actually carrying out the authentication process is that the driver keep the brake pedal 5 depressed during this process. If this is done, and the process has been successfully completed (a valid authentication element has been identified), the immobilizer control unit initiates engine starting by switching on the ignition. At the same time, it also activates the rest of the vehicle's power supply for peripheral vehicle components, such as the car radio and the like, and an associated starter. In this case, before actually starting the engine, the system determines whether the automatic transmission selection lever 8 is in the park position P or neutral position N and, if necessary, does not start the engine until the selection lever 8 has been moved to one of these positions.

Alternatively, it is possible to initiate an authentication process by depressing the brake pedal 5, with the ignition being switched on when driving authorization is confirmed.

The engine can then be started automatically by the immobilizer control unit, or on request by the driver via a further immobilizer operating element, provided the transmission selection lever 8 is once again in a suitable position.

In order to stop the engine, the vehicle user needs only to press the button 9 once again, so that it assumes its ignition-off state again. At the same time, the system also determines whether the vehicle is stationary, and does not switch the engine off until it is. The fact that the vehicle is stationary can be identified, for example, via a speed sensor, or from the fact that the automatic transmission selection lever 8 is in the park position P or in the neutral position N.

The immobilizing device shown in FIG. 1 has the advantage that it requires no mechanical or electronic ignition key/ignition lock system. Furthermore, it requires no action on the authentication element while, nevertheless, the vehicle user retains control of the security state relating to driving authorization for the vehicle at all times. That is, the immobilizer actuation commands are initiated only on request by him or her. At the same time, this device provides both a high level of operating convenience and a high level of protection against use by third parties, since the ignition can be switched on and the engine started only by users who are carrying a valid authentication element. In order to start the vehicle, an authorized user needs only to operate the button 9 followed by the brake pedal 5; and to stop the vehicle, needs only to operate the button 9 once again.

As an alternative to initiation of engine starting via the brake pedal 5, engine starting can be activated via the same control element as the switching on of the ignition which requires authentication. In this case, an immobilizer operating element which can be operated in a number of stages is provided by, for example, configuring the button 9 in FIG. 1 as a multistage button. An example of such a button is illustrated, with its switch positions, in FIG. 2, in which the respective switch positions are shown diagrammatically, with respective switch operation steps a–e.

Figure 2:
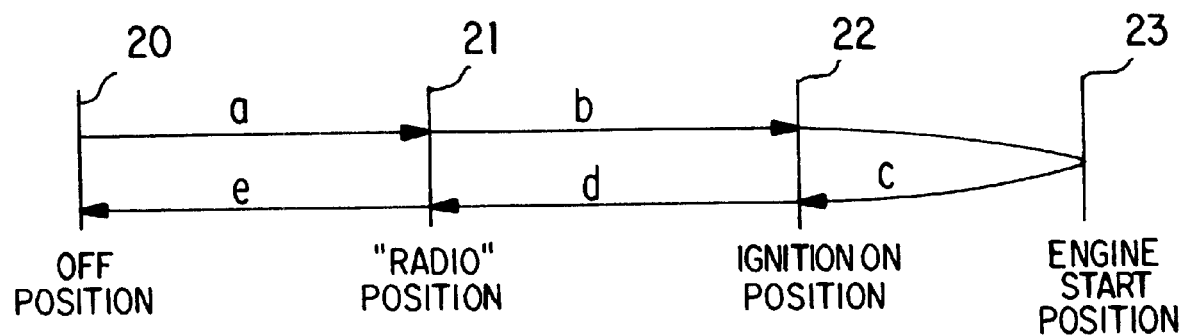
FIG. 2 is a schematic illustration of the switching stages of a multistage immobilizer button for an entirely button-controlled immobilizing device which differs from that shown in FIG. 1.

In the example in FIG. 2, the button element can be moved from an off position "20" via a first button operation a to a so-called "radio" position 21, in which the standardized terminal 15R (which supplies the peripheral vehicle components such as the car radio, etc.) is live. From the "radio" position 21, the button can then be switched to an ignition-on state 22 (standardized terminal 15 is live), by a second button operation b. At the same time as the first-mentioned button operation a or the last-mentioned button operation b, an authentication communication process for the electronic immobilizing device is initiated, by which driving authorization is checked. Actual switching on of the ignition is carried out only after the driving authorization check has been successfully completed.

The standardized terminal 50 can then be made live by a third button operation c, so that the starter is activated and the engine is started (position 23). Button operation c is expediently configured not to be latched, as is indicated by the reversal of the arrow in FIG. 2; that is, the button element returns to the ignition-on position 22 when it is released.

In order to switch off the engine, the button element is switched back to its "radio position" 21 by another button operation d, so that the ignition is switched off and the engine is thus stopped, provided the transmission selection lever is in the park or neutral position and/or the vehicle speed is equal to zero. A further rearward button element operation e can be used to switch the peripheral vehicle components off, and the button assumes its off position "20" once again.

The button element may be designed in various ways to achieve the switching behaviour illustrated in FIG. 2. For example, in one implementation, the button operates on the ball-pen principle, in which engine starting is activated by depressing the button completely and holding it in the depressed position until the engine starts. Once the ball-pen button has been released, it returns to its ignition-on position. If required, a mechanically acting steering lock can simultaneously be coupled to the button by means of this changeover, which is carried out mechanically, with such a ball-pen button, between the ignition-off and the ignition-on position. Alternatively, the ball-pen button response can be implemented electrically. As further alternatives, cyclically switching buttons may be used, once again optionally configured to switch mechanically or electrically. In all these cases, to control the immobilizer functions, the vehicle driver needs to operate only one button element and to carry his or her valid authentication element. No action is required of the driver.

As is evident from the examples described above, the immobilizing device according to the invention allows a very high level of operating convenience for arming and disarming an immobilizer as well as for switching the vehicle engine on and off. The invention is of course not limited to keyless-go systems, but can also expediently be used for other electronic immobilizing devices, as well as for mechanical immobilizing devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Immobilizing device for a motor vehicle having a brake pedal, comprising:
   an immobilizer control unit, which is mountable on a vehicle, and which allows driving operation of a vehicle only if an access authorization check is positive;
   at least one authentication element which can be carried by a vehicle user; and
   an actuation communication channel for immobilizer actuation communications which require authentication, between the at least one authentication element and the immobilizer control unit;
   wherein the immobilizer control unit enables and activates engine starting in response to operation of the brake pedal when an authentication signal communicated from the authentication element is present; and
   further comprising an immobilizer operating element including a button element arranged on a transmission selection lever of the vehicle.

2. Immobilizing device for a motor vehicle, comprising:
   an immobilizer control unit, which is mountable on a vehicle, and which allows driving operation of a vehicle only if an access authorization check is positive;
   at least one authentication element which is transportable by a vehicle user;
   an actuation communication channel for immobilizer actuation communications which require authentication, between the at least one authentication element and the immobilizer control unit; and
   an immobilizer operating element, which is adapted to be arranged on the vehicle and is operable without any manipulation of the authentication element by the vehicle user, for user-requested initiation of an immobilizer actuation communication which requires authentication;
   wherein the immobilizer operating element comprises a multistage button element, having at least first and second button stages; wherein the first button stage initiates an ignition switching-on process which requires authentication, and the second button stage initiates an ignition switching-off process.

3. Immobilizing device for a motor vehicle having a brake pedal, comprising:
   an immobilizer control unit, which is mountable on a vehicle, and which allows driving operation of a vehicle only if an access authorization check is positive;
   at least one authentication element which can be carried by a vehicle user; and
   an actuation communication channel for immobilizer actuation communications which require authentication, between the at least one authentication element and the immobilizer control unit;
   wherein the immobilizer control unit enables and activates engine starting in response to operation of the brake pedal when an authentication signal communicated from the authentication element is present; and
   wherein the immobilizer operating element comprises a multistage button element, having at least first and second button stages; wherein the first button stage initiates an ignition switching-on process which requires authentication, and the second button stage initiates an ignition switching-off process.

4. Immobilizing device for a motor vehicle, comprising:
   an immobilizer control unit, which is mountable on a vehicle, and which allows driving operation of a vehicle only if an access authorization check is positive;
   at least one authentication element which is transportable by a vehicle user;
   an actuation communication channel for immobilizer actuation communications which require authentication, between the at least one authentication element and the immobilizer control unit; and
   an immobilizer operating element, which is adapted to be arranged on the vehicle and is operable without any manipulation of the authentication element by the vehicle user, for user-requested initiation of an immobilizer actuation communication which requires authentication;
   wherein the immobilizer operating element comprises a multistage button element having at least first and second button stages; wherein the first button stage is used to initiate an ignition switching-on process which requires authentication, and the second button stage is used to initiate engine starting.

5. Immobilizing device for a motor vehicle, comprising:
   an immobilizer control unit, which is mountable on a vehicle, and which allows driving operation of a vehicle only if an access authorization check is positive;
   at least one authentication element which is transportable by a vehicle user;
   an actuation communication channel for immobilizer actuation communications which require authentication, between the at least one authentication element and the immobilizer control unit; and an immobilizer operating element, which is adapted to be arranged on the vehicle and is operable without any manipulation of the authentication element by the vehicle user, for user-requested initiation of an immobilizer actuation communication which requires authentication;

wherein the immobilizer operating element comprises a button element arranged on a transmission selection lever of the vehicle.

6. The immobilizing device according to claim 5, wherein the immobilizer control unit enables and activates engine starting in response to operation of the brake pedal.

7. Immobilizing device for a motor vehicle, comprising:

an immobilizer control unit, which is mountable on a vehicle, and which allows driving operation of a vehicle only if an access authorization check is positive;

at least one authentication element which is transportable by a vehicle user;

an actuation communication channel for immobilizer actuation communications which require authentication, between the at least one authentication element and the immobilizer control unit; and an immobilizer operating element, which is adapted to be arranged on the vehicle and is operable without any manipulation of the authentication element by the vehicle user, for user-requested initiation of an immobilizer actuation communication which requires authentication;

wherein the immobilizer operating element comprises a brake pedal of the vehicle.

8. The immobilizing device according to claim 7, wherein the immobilizer control unit enables and activates engine starting in response to operation of the brake pedal.

* * * * *